(12) United States Patent
Ozbag

(10) Patent No.: US 12,717,303 B2
(45) Date of Patent: Aug. 25, 2026

(54) HAZELNUT PROCESSING PLANT FAILURE MONITORING AND SHUTDOWN AUTOMATION SYSTEM

(71) Applicant: BALSU GIDA SANAYI VE TICARET ANONIM SIRKETI, Sakarya (TR)

(72) Inventor: Nusret Ozbag, Sakarya (TR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 373 days.

(21) Appl. No.: 18/291,575

(22) PCT Filed: Jul. 22, 2022

(86) PCT No.: PCT/TR2022/050779
§ 371 (c)(1), (2) Date: Jan. 24, 2024

(87) PCT Pub. No.: WO2023/033760
PCT Pub. Date: Mar. 9, 2023

(65) Prior Publication Data

US 2025/0093839 A1 Mar. 20, 2025

(30) Foreign Application Priority Data

Sep. 6, 2021 (TR) ............................... 2021/013959

(51) Int. Cl.
*G05B 19/406* (2006.01)

(52) U.S. Cl.
CPC .. *G05B 19/406* (2013.01); *G05B 2219/31439* (2013.01)

(58) Field of Classification Search
CPC ........ G05B 2219/31439; G05B 23/027; G05B 19/406; G05B 23/0289
See application file for complete search history.

(56) References Cited

U.S. PATENT DOCUMENTS 6,817,757 B1 * 11/2004 Wallace ................. G01K 1/024 374/E1.004
2013/0110580 A1 * 5/2013 Sholl ................ G06Q 10/06395 705/7.28
2021/0377141 A1 * 12/2021 Priyadarsini ............ H04L 43/04
2024/0122216 A1 * 4/2024 Van Doorn ............. A23L 13/57

FOREIGN PATENT DOCUMENTS

CN 104914831 A 9/2015
CN 111352383 A 6/2020
WO 2013071303 A1 5/2013

* cited by examiner

*Primary Examiner* — Rami R Okasha
(74) *Attorney, Agent, or Firm* — Bayramoglu Law Offices LLC

(57) ABSTRACT

An automation system is provided. The automation system is configured for providing controlling of pluralities of processing machines provided for each process realized as from the first step, where unshelled hazelnuts are taken to a hazelnut processing plant, until the final step. The automation system includes a plurality of sensors, a processor unit, a warning unit, and a communication unit.

6 Claims, 1 Drawing Sheet

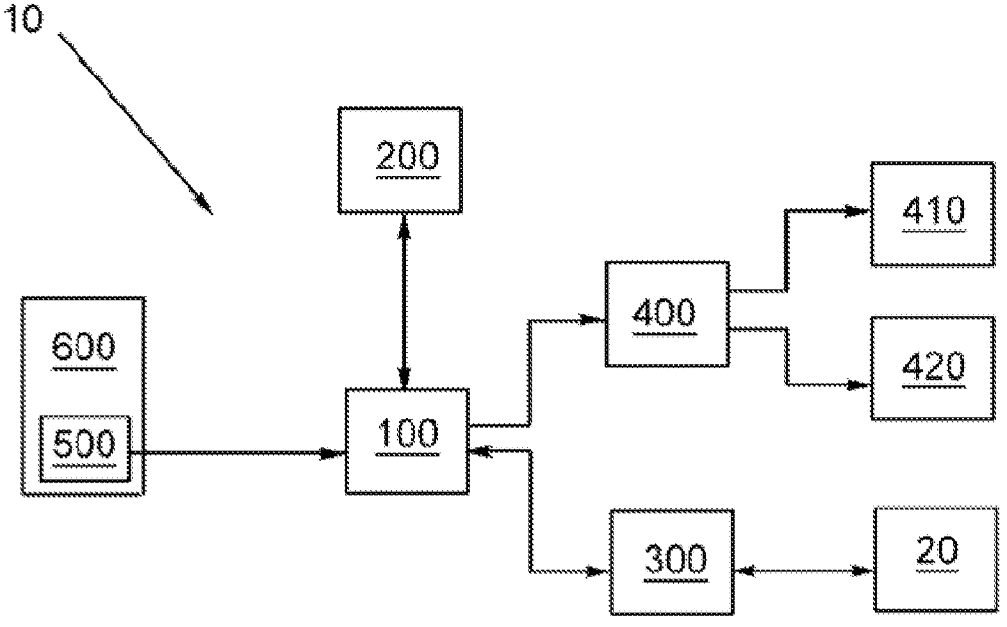
10
200
410
400
420
600
100
500
300
20

HAZELNUT PROCESSING PLANT FAILURE MONITORING AND SHUTDOWN AUTOMATION SYSTEM

CROSS-REFERENCE TO THE RELATED APPLICATIONS

This application is the national phase entry of International Application No. PCT/TR2022/050779, filed on Jul. 22, 2022, which is based upon and claims priority to Turkish Patent Application No. 2021/013959, filed on Sep. 6, 2021, the entire contents of which are incorporated herein by reference.

TECHNICAL FIELD

The present invention relates to an automation system for providing controlling of pluralities of processing machines provided for each process realized as from the first step, where unshelled hazelnuts are taken to a hazelnut processing plant, until the final step.

BACKGROUND

In hazelnut processing plants, unshelled hazelnuts are cleaned from its shells and are turned into decorticated hazelnut form and said decorticated hazelnuts are packaged according to their dimensions. Hazelnut processing plant comprises pluralities of process units for realizing said processes. Said process units include pluralities of machines. Said machines are connected to each other by means of lines. Hazelnut processing plant is essentially formed by three main units. The first one of said main units includes an unshelled hazelnut taking point where the unshelled hazelnut is first taken to the plant and a pre-cleaning unit which provides cleaning of unshelled hazelnut. Another one of said main units is the new breaking plant and comprises an unshelled hazelnut silo where the hazelnuts, cleaned in the cleaning unit, are temporarily stored, calibration sieves where said unshelled hazelnuts are sieved according to their dimensions, silos where the unshelled hazelnuts, separated according to their dimensions in said calibration sieves, are stored temporarily according to their sizes, a breakage line where the shells of the unshelled hazelnuts, separated according to their dimensions and stored in silos, are broken, and a laser line where the rotten hazelnuts are eliminated from the hazelnuts broken at said breaking line. Another one of said main units is the new sieving plant and comprises a pre-cleaning unit for cleaning shells of the unshelled hazelnuts, calibration sieves for separating the decorticated hazelnut, cleaned from the shells, into dimensions, silos where the decorticated hazelnut, separated into dimensions at said calibration sieves, are stored, a laser line for separating the rotten hazelnuts which exist in the decorticated hazelnut taken from silos, a selection unit for separating the rotten hazelnuts detected in the laser line, and a big bag filling unit for providing packaging of decorticated hazelnut separated according to their dimensions. Hazelnuts are passed through said units until they are turned into decorticated hazelnut form from the unshelled hazelnut form and are packaged and stored in a compliant manner to their dimensions.

In hazelnut processing plant, there are pluralities of machines which provide realization of each process as from said unshelled hazelnut taking unit until the packaging unit. There are systems which control operation of each machine. Said systems are operated in an independent manner from each other. In case failure occurs in any of the machines, other machines continue the processes. If the other machines continue their processes, due to the fault which occurs depending on the machine with failure, the hazelnut can be processed in a faulty manner. Hazelnuts can be processed in a faulty manner until the machine with failure is detected. This may lead to damaging of hazelnuts. Faultily processed hazelnuts may lead to monetary damage.

As a result, because of the abovementioned problems, an improvement is required in the related technical field.

SUMMARY

The present invention relates to an automation system, for eliminating the abovementioned disadvantages and for bringing new advantages to the related technical field.

An object of the present invention is to provide an automation system which provides control of all machines which exist in the hazelnut processing plant.

In order to realize the abovementioned objects and the objects which are to be deducted from the detailed description below, the present invention is an automation system for providing controlling of pluralities of processing machines provided for each process realized as from the first step, where unshelled hazelnuts are taken to a hazelnut processing plant, until the final step. Accordingly, in order to provide controlling the process steps realized by each machine, the subject matter automation system comprises pluralities of sensors placed onto the machines, a processor unit for taking the data collected by means of said sensor, a warning unit associated with said processor unit, a communication unit for informing a far user by operating said warning unit; the processor unit is configured to provide taking of a condition data, including the processing steps of hazelnut, instantaneously from the sensors provided to each machine; provide comparing of said condition data with predetermined data; provide producing of a failure signal in case it detects that the condition data is different from at least one of the predetermined data as a result of comparison; provide operating of the warning unit depending on said failure signal; provide shutting down of all machines depending on operation of the warning unit; provide transferring of a warning signal, generated depending on operation of the warning unit, to a far user by means of the communication unit. Thus, all machines provided in the hazelnut processing plant are controlled by means of a processor unit, the hazelnuts are prevented from being damaged in case of a failure, and the authorized persons are warned about the failure.

In a possible embodiment of the present invention, the warning unit comprises an audible warning unit provided in the vicinity of each machine. Thus, the personnel who exist in the vicinity of the machine are warned in an audible manner in case of failure.

In another possible embodiment of the present invention, the warning unit comprises a visual warning unit provided in the vicinity of each machine. Thus, the personnel who exist in the vicinity of the machine are warned in a visual manner in case of failure.

In another possible embodiment of the present invention, a server is provided which is connected to the communication unit. Thus, the failure data is temporarily stored.

In another possible embodiment of the present invention, a memory unit is provided which is associated with the processor unit and which is for storing the predetermined process steps.

In another possible embodiment of the present invention, said memory unit is configured to provide storage of the formed failure records in a manner including time data. Thus, the data can be controlled afterwards.

BRIEF DESCRIPTION OF THE DRAWINGS

In the FIGURE, a representative view of an automation system is given.

REFERENCE NUMBERS

10 Automation system
100 Processor unit
200 Memory unit
300 Communication unit
400 Warning unit
 410 Audible warning unit
 420 Visual warning unit
500 Sensor
600 Machine
20 Server

DETAILED DESCRIPTION OF THE EMBODIMENTS

In this detailed description, the subject matter automation system is explained with references to examples without forming any restrictive effect only in order to make the subject more understandable.

The present invention relates to an automation system (10) for providing controlling of pluralities of processing machines (600) provided for each process realized as from the first step, where unshelled hazelnuts are taken to a hazelnut processing plant, until the final step.

With reference to the FIGURE, said automation system (10) comprises pluralities of sensors (500) placed particularly to each machine (600) for providing controlling of the processes realized by each machine (600). Said sensors (500) provide collection of data through the machines (600) in a manner providing measuring and defining of each process realized by the machines (600). For instance, separation of hazelnuts, broken in the breaking plant which exists in the hazelnut processing plant, from shells and the complete separation of decorticated hazelnut and shells can be detected by means of a laser. As the laser scans the line, the machine (600) can be guided in relation to presence of foreign objects or shells between the hazelnuts. Sensors (500) facilitate controlling of the realized process. There is a processor unit (100) for taking the data collected from sensors (500). Said processor unit (100) can be a microprocessor, a PLC, a computer, etc. embodied to provide reading of the computer controlled software. There is a warning unit (400) which is operated in case an unfavorable condition is detected by means of the processor unit (100). In a preferred embodiment of the present invention, said warning unit (400) comprises a visual warning unit (420). Said visual warning unit (420) can be at least one illumination element, a screen, etc. provided in a special manner for each machine (600). In another preferred embodiment of the present invention, said warning unit (400) comprises an audible warning unit (410). Said audible warning unit (410) can be at least one loudspeaker, a microphone, etc. provided in a special manner for each machine (600). In another preferred embodiment of the present invention, both audible and visual warning can be provided through a digital screen provided for each machine (600). The warning unit (400) is operated in case it is detected that a failure occurs on any machine (600) inside the hazelnut processing plant and provides warning of the nearby personnel in relation to the machine (600) where the failure occurs. There is a memory unit (200) connected in a manner providing data reading and data writing by the processor unit (100). Said memory unit (200) is configured to provide storing of software commands prepared beforehand for operation of the machines (600) by the processor unit (100). There is a communication unit (300) associated with the processor unit (100). Said communication unit (300) is configured to provide transfer the data, received from the processor unit (100), to a far server (20). A user, who exists at a far location from the hazelnut processing plant, can provide displaying of a warning signal formed by means of the processor unit (100) by means of a user terminal connected to the server (20). In a possible embodiment of the present invention, a mobile application, which is provided to a mobile device, can be used as said user terminal.

The processor unit (100) controls operation of each machine (600) used for each step which passes until the unshelled hazelnuts, taken to the hazelnut processing plant, are packaged in the form of decorticated hazelnut. The processor unit (100) provides instantly taking of data, related to operation condition of machines (600), from the sensors (500) provided on the machines (600). The memory unit (200) provides storage of the process steps needed for operation of machines (600). The processor unit (100) provides comparing of data, collected from the sensors (500), with the process steps stored in the memory unit (200). As a result of comparison, the processor unit (100) provides operation of the warning unit (400) in case it is detected that the condition data taken from the sensors (500) is different from at least one of the process steps kept in the memory unit (200). As the warning unit (400) is operated, the machines (600) are shut down by means of the processor unit (100). The processor unit (100) provides sending of a warning signal to the server (20) by means of the communication unit (300) for providing informing of a far user. Said user can display the warning signal by means of the user terminal.

An exemplary operation scenario of the present invention is described below;

In the hazelnut processing plant, hazelnuts are passed through pluralities of steps and are packaged. There are pluralities of lines comprising pluralities of machines (600) provided for realizing said steps. Said machines (600) are connected to each other by means of said lines. Unshelled hazelnuts which are brought to the hazelnut processing plant are firstly transferred to the unshelled hazelnut taking unit. Unshelled hazelnuts are transferred to a cleaning unit by means of a line from the unshelled hazelnut taking unit. In said cleaning unit, the unshelled hazelnuts are passed through a pre-cleaning process and foreign substances are cleaned therefrom. The cleaned unshelled hazelnuts are transferred to the first storage unit by means of a line. In the first storage unit, unshelled hazelnuts are temporarily stored. Hazelnuts are transferred to the first sieving unit from the storage unit. At the first sieving unit, unshelled hazelnuts are passed through calibration sieves for providing separation of unshelled hazelnuts in accordance with their dimensions. Unshelled hazelnuts which exit the first sieving unit are separated in accordance with predetermined dimension ranges. The unshelled hazelnuts separated in accordance with their dimensions are stored in a second storage unit in a compliant form to their dimensions. The hazelnuts stored in the second storage units separated according to their dimensions are separated into different lines and are broken by means of the breaking unit. The unshelled hazelnuts broken in the breaking unit are passed through the first laser unit. Rotten hazelnuts are selected from decorticated hazelnuts broken in the first laser unit. The hazelnuts, passed through the first laser unit, are transferred to the second cleaning unit. Decorticated hazelnuts, separated from their shells in the second cleaning unit, are cleaned from their shells. Decorticated hazelnuts, which are cleaned from shells, are passed through the second laser unit and the foreign substances or rotten hazelnuts which remain between the hazelnuts are selected. The cleaned decorticated hazelnuts are passed through the selection line and the detected shells and rotten hazelnuts are cleaned. The cleaned decorticated hazelnuts are transferred to the packaging unit. The hazelnuts separated into dimensions are packaged according to their dimensions. In the hazelnut processing plant, there are pluralities of machines (600) which provide realization of each process as from the unshelled hazelnut taking unit until the packaging unit. Each of said machines (600) is configured to realize a different process step. The memory unit (200) is embodied to provide storage of said process steps. A condition data, including the information whether each process is realized or not, is instantaneously transferred to the processor unit (100) by means of sensors (500) provided on the machines (600). The processor unit (100) provides comparing of the process steps, stored in the memory unit (200), and the process steps taken from the sensors (500). As a result of the comparison, in case at least one difference is detected in any step, a warning signal is produced for operation of the warning unit (400). Said warning signal comprises the information indicating the unit and/or line where failure occurs inside the plant. In this case, the illumination unit and/or loudspeaker, provided in the vicinity of the determined machine (600) in the warning signal, is/are operated by means of the warning unit (400). Thus, the personnel who exist in the plant are warned about the line where failure exists. The processor unit (100) moreover provides shutting down of all the machines (600) which exist in the hazelnut processing plant depending on the warning signal. The processor unit (100) moreover provides transfer of said warning signal to the server (20) by means of the communication unit (300). A user who has access to the server (20) can be warned about the failure by means of a mobile device. The processor unit (100) provides formation of a report, which includes the information related to the failure reason, the machine (600) where failure occurs and the failure time, etc., in order to be used later. This report is recorded in the memory unit (200) in order to be used later.

In an exemplary operation scenario of the present invention, in the hazelnut processing plant, the hazelnuts taken to the unshelled hazelnut taking unit are firstly transferred to the cleaning unit and then to the first storage unit. The processor unit (100) which is the control unit of the automation system (10) provides comparing of each process with the process steps stored in the memory unit (200). During separation of the hazelnuts, transferred from the first storage unit to the first sieving unit, into dimensions in the first sieving line, the processor unit (100) detects that the processing signal, taken from a sensor (500) provided to the first sieving unit, is not the same as the process step kept in the memory unit (200). The processor unit (100) provides production of a warning signal indicating that there is a failure in the first sieving line. The warning unit (400) is operated depending on the warning signal. As the warning unit (400) is operated, the lamps, provided on the first sieving unit, are turned on and off with frequencies of 3 seconds. At the same time, a loudspeaker is operated and an audible message, indicating that there is failure in the first sieving line, is spread so as to be heard within the plant. In this case, the personnel in the plant can see or hear that there is failure in the first sieving line and can intervene to the failure in the shortest time. The processor unit (100) stops operation of all machines (600), which exist in the plant, by means of production of the warning signal. Thus, hazelnuts are prevented from being damaged as a result of a machine (600) which works faultily. The processor unit (100) moreover provides transfer of the warning signal to a far server (20) by means of the communication unit (300). An authorized person, connected to the far server (20) by means of a mobile application, is informed about the failure which occurs in the plant. Said mobile application can comprise an audible or visual message for providing informing of the authorized person. For instance, an audible message is transferred to the phone of the authorized person. The processor unit (100) moreover provides reporting of data which includes information like the step in which the failure occurs at the first sieving line, the time of failure and the elimination duration of the failure, etc. The reported information is recorded to the memory unit (200) in order to be used later.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. An automation system for providing controlling of a plurality of processing machines provided for each process realized as from a first step, where unshelled hazelnuts are taken to a hazelnut processing plant, until a final step, wherein in order to provide controlling the process steps realized by each of the plurality of processing machines, the automation system comprises a plurality of sensors placed onto the plurality of processing machines, the plurality of sensors including at least one laser sensor configured to scan a line of the hazelnut processing plant to detect separation of hazelnuts from shells and presence of foreign objects or shells between the hazelnuts; a processor unit for taking data collected by means of the plurality of sensors: a warning unit associated with the processor unit; and a communication unit for informing a far user by operating the warning unit; wherein the processor unit is configured to:

- take condition data, comprising the processing steps of hazelnut, instantaneously from the plurality of sensors provided to each of the plurality of processing machines;
- compare the condition data with predetermined data;
- produce a failure signal in case the processor unit detects that the condition data is different from at least one of the predetermined data as a result of comparison;
- operate the warning unit depending on the failure signal;
- shut down all of the plurality of processing machines depending on operation of the warning unit; and
- transfer a warning signal, generated depending on operation of the warning unit, to the far user by means of the communication unit.

2. The automation system according to claim 1, wherein the warning unit comprises an audible warning unit provided in a vicinity of each of the plurality of processing machines.

3. The automation system according to claim 1, wherein the warning unit comprises a visual warning unit provided in a vicinity of each of the plurality of processing machines.

4. The automation system according to claim 1, wherein a server is provided, wherein the server is connected to the communication unit.

5. The automation system according to claim 1, wherein a memory unit is provided, wherein the memory unit is associated with the processor unit and the memory unit is for storing the predetermined process steps.

6. The automation system according to claim 5, wherein the memory unit is configured to provide storage of formed failure records in a manner comprising time data.

* * * * *